(12) United States Patent
Peteri

(10) Patent No.: US 8,707,987 B2
(45) Date of Patent: Apr. 29, 2014

(54) BOILING WATER TAP

(75) Inventor: Niels Theodoor Peteri, Rotterdam (NL)

(73) Assignee: Henri Peteri Beheer B.V., Ridderkerk (NL)

( * ) Notice: Subject to any disclaimer, the term of this patent is extended or adjusted under 35 U.S.C. 154(b) by 0 days.

(21) Appl. No.: 13/497,543

(22) PCT Filed: Sep. 22, 2010

(86) PCT No.: PCT/EP2010/063986
§ 371 (c)(1),
(2), (4) Date: May 29, 2012

(87) PCT Pub. No.: WO2011/036181
PCT Pub. Date: Mar. 31, 2011

(65) Prior Publication Data
US 2012/0227841 A1 Sep. 13, 2012

(30) Foreign Application Priority Data
Sep. 25, 2009 (NL) ...................................... 2003554

(51) Int. Cl.
*F16K 37/00* (2006.01)
(52) U.S. Cl.
USPC .............................. 137/552; 137/551; 251/96
(58) Field of Classification Search
USPC ................ 137/551, 554, 552; 251/96, 129.04
See application file for complete search history.

(56) References Cited

U.S. PATENT DOCUMENTS

| 3,805,096 A * | 4/1974 | Hamilton, II ................. 307/116 |
| 3,829,850 A | 8/1974 | Guetersloh |
| 4,549,716 A * | 10/1985 | Warren ............................ 251/96 |
| 4,911,335 A * | 3/1990 | Stofle et al. .................... 222/192 |
| 7,228,874 B2 * | 6/2007 | Bolderheij et al. ...... 251/129.04 |
| 2007/0069169 A1 | 3/2007 | Lin |
| 2007/0246550 A1* | 10/2007 | Rodenbeck et al. ........ 236/12.11 |

FOREIGN PATENT DOCUMENTS

| EP | 0497269 | 5/1996 |
| EP | 0792970 | 9/1997 |
| EP | 0856945 | 4/2002 |
| JP | 11303756 | 5/2001 |
| WO | 9424645 | 10/1994 |
| WO | WO/2007059051 A2 * | 5/2007 |
| WO | 2009035319 | 3/2009 |

OTHER PUBLICATIONS

International Search Report, mailed Dec. 23, 2010 in connection with International Patent Application No. PCT/EP2010/063986.
Machine translation of JP 11303756.
Machine translation of EP 0856945.

* cited by examiner

*Primary Examiner* — John Rivell
(74) *Attorney, Agent, or Firm* — Westman, Champlin & Koehler, P.A.

(57) ABSTRACT

A water tap is disclosed, which comprises
an operating element for operating the tap, a sensor for detection of the touch of at least a portion of the tap by an object and generation of a detection signal and signalling means for generation of a warning signal based on the detection signal. The sensor and the signalling means are configured to generate a warning signal at a touch of at least a portion of the tap. A hot water system comprising the water tap is also disclosed.

18 Claims, 3 Drawing Sheets

BOILING WATER TAP

PRIORITY CLAIM TO RELATED APPLICATIONS

This application is a national stage application under 35 U.S.C. §371 of PCT/EP2010/063986, filed Sep. 22, 2010, published as WO 2011/036181 A1 on Mar. 31, 2011, and claiming priority to Dutch Application No. NL2003554, filed Sep. 25, 2009, which both international and Dutch applications and publications are incorporated herein by reference and made a part hereof in its entirety, and the benefit of priority of which is claimed herein.

DESCRIPTION

The present disclosure relates to a water tap, in particular a kitchen tap such as a boiling water tap.

A multitude of types and models of water taps is known. Examples are single taps that are arranged for closing a single supply line and mixing faucets that are arranged for opening/closing different supply lines to a common outlet. Also, taps are known for cooled and/or filtered water. Further, taps for (near) boiling water for consumption have made an appearance. Due to this diversity that has arisen, it appears that there can be uncertainty for users about the temperature (to be expected) of the dispensed water. This uncertainty may cause substantial risks with respect to boiling water taps in the kitchen. With existing boiling water taps it is attempted to reduce these risks by making the operation different from "non-dangerous" taps.

A boiling water tap is known that is operated by pressing a press-button on an operating panel one or more times, after which the boiling water is dispensed and a lamp on the operating panel lights up.

Another boiling water tap is described in EP 0 792 970 and is provided with a "child proof" operation, wherein in operation a push-turn motion must be executed with the operating knob. Such operation prevents accidental opening of the tap but it can usually be executed rather simply by an adult to open the tap intentionally.

Nevertheless there exists a desire for a more secure tap, in particular for (near) boiling water. It appears in practice that intentional opening of the tap, even by means of e.g. the said push-turn motion, does not always make the user sufficiently aware of the fact that the respective tap is no ordinary water tap. Moreover, the newest boiling water systems have almost no initial flow of cold water or "cold lead" anymore, that is, the (near) boiling water is dispensed from the outlet almost immediately. Due to this, a user who holds his hands under the tap has insufficient time to react to the very high temperature of the water that is already dispensed.

Operating elements that are activated by proximity switches, e.g. as used in taps for sanitary applications as in EP 0 497 269 are therefore unfit for application in hot water or boiling water taps. With such operation, unintentional nearing the tap with the hand could lead to scalds. A proximity switch is therefore unfit as a sensor because the warning signal could be activated accidentally: having or bringing a hand in the vicinity of the tap could trigger a warning signal without the person intending to use the tap. Thus frequently caused "false alarms" could reduce the effectiveness of the warning signal and could itself be experienced as annoying.

The presently provided tap according to the therefore provides a warning signal just upon touching the tap, and thereby prior to the actual operation of the tap. In this way a user is informed timely about the possible danger of opening the tap so that said user can reconsider actually operating and opening the tap.

The tap is therefore only opened if the user performs a physical operation which is more than merely touching the tap. By means of the sensor the warning signal is only generated at the moment a user actually touches the tap and therewith signals his intention to operate the tap. In this way a direct and noticeable link can be made by the user between touching the tap to operate it and the warning signal. A user, especially a user who is unaccustomed to the tap, will therefore be warned effectively before proceeding to dispense hot or boiling water. Preferably the tap, and in particular the sensor, is configured to detect only touching of the operating element proper, e.g. a turning knob or an operating handle, which further stresses the direct relationship between the signal and the operation.

Preferably, the signal is temporary, e.g. lasting a predetermined time, which may be adjustable, or lasting a variable time, e.g. until the tap has actually been opened. Preferably, the signal lasts until the tap has been closed after use and/or as long as the sensor detects the touching of the object, so that the link between the touching and/or the operation of the tap and the warning signal is noticeable by the user more easily and the warning function is increased. This prevents, reduces or slows undesirable getting accustomed to or even getting irritated by the warning signal, compared to a warning signal that is present permanently, i.e. also when no intention to operate the tap is present. This improves acceptance and appreciation by a user of the warning signal and therewith of the effect of the signal.

A temporary signal, in particular a signal that is linkable to a directly apparent cause, may moreover be present more strongly than a permanent signal without being perceived as annoying, so that a stronger signal and therefore a stronger warning function may be provided. Also, a temporary signal costs less energy than a continuous signal.

In an embodiment, the water tap is arranged for detecting a portion of a human body, in particular a hand. Thus, a warning signal due to accidental contact of the tap with an insulating object (e.g. a cup, a cutting board, etc) is prevented.

In an embodiment, the water provides an increased reliability to the detection and therefore to the warning function since frequency changes and/or phase changes with respect to a signal imposed on at least a part of the tap, e.g. a knob may be detected sensitively and reliably. Further, e.g. in case of capacitive detection, the portion of the tap of which touching should be detected may be insulated electrically which increases safety of the tap. Oscillating circuits may be arranged at a distance from the tap, e.g. in a kitchen cupboard underneath a work top onto which the tap has been arranged, wherein a portion of the circuit is connected with the portion of the tap of which touching should be detected. A circuit based on an astable multivibrator may be designed to be less sensitive than a resonance circuit to stray capacitances between the portion of which touching should be detected and a circuit arranged at a distance from it, e.g. in a kitchen cupboard and remote from the tap.

By providing the detection circuit with an astable multivibrator with a hysteresis loop 14A (shown in FIG. 2) the detector may be operated more reliably across a bigger range of contact-impedances and/or rapid impedance changes, e.g. corresponding to the difference between touching of the tap by a person with dry hands and on rubber soles or by the same person with wet hands and bare feet on a conducting floor, while correcting for slow changes such as floating voltages and/or leak voltages is facilitated. Thus, a water tap according to claim 4 provides an increased safety.

In an embodiment, the water tap is arranged to generate a sound signal which may provide an effective warning function. A suitable signal may be a single beeping signal, a series of beeps, a continuous tone, a melody and/or a speaking voice.

By means of a light signal a clearly recognisable warning signal may be provided, for which the tap according to claim 6 is provided. Red light is generally associated with danger and with heat, so that red coloured light is preferred. The signal may comprise a single pulse, a flashing signal and/or continuous light.

Light and/or sound provide different types of information than tactile information such as touching, pressing and/or turning, so that combined sensory information is offered and an additional warning function is obtained.

In an embodiment, the tap provides an increased signalling function, since generally a seam is present between a tap housing and an operating knob which results in a relatively dark, generally annular, portion of the tap. This is especially holds in the case of a press-rotate knob in which the seam must accommodate a displacement of the knob for the pushing motion. By illuminating such a dark portion, the lighting up is extra conspicuous. Furthermore, the light source may be cosmetically removed by masking it with the knob.

In an embodiment, the tap provides a warning signal all around the tap, so that it is independent of direction. A substantially symmetric signal is furthermore considered aesthetically pleasing, so that acceptance of the tap and the warning signal is enhanced.

In an embodiment, the tap, which may be realised efficiently with one or more chrome-plated tap parts, a light guide may be obviated for at least a portion of the intended light path. Damage, soiling and/or discoloration through aging of a light guide may be prevented and the appearance of the tap need not be adapted. The reflections of the light may occur off highly reflecting surfaces, which may provide a high light yield. Curved and/or rough surfaces may be used for causing dispersing and/or diffusing of the light to be emitted.

At an embodiment of the water tap a surprise effect of the signal is increased due to the invisibility of the source of, in particular, the light signal so that the warning effect of the signal is increased. Further, invisibly arranged objects are less touchable due to which the chances of damaging of the signalling means are reduced. A hidden arrangement of electrical parts further provides less chances of intrusion of moisture into them, en thereby possible occurrence of short circuiting.

In an embodiment, the tap provides increased (child-) safety by preventing operation with a single movement such as pushing or twisting only in one direction. Due to this, accidental and/or unintentional operation is prevented. Preferably, the multiple and/or compound motion comprises push-turn and/or pull-turn motions. A non-rectilinear pushing motion such as a zig-zag motion is also conceivable.

A hot water system provided with a water tap as described above provides improved safety against scalding. By means of an embodiment of the system provided herein, running boiling water, or very hot water, may be provided in a safer manner.

The disclosure will hereafter be explained based on the attached drawings showing an embodiment of the present disclosure by way of non-limiting illustration.

The figures are schematic and possibly not to scale; details which are not required for understanding the disclosure may have been left out. Elements which are substantially similar and/or fulfil a similar function are provided with the same reference symbol.

Figure 1:
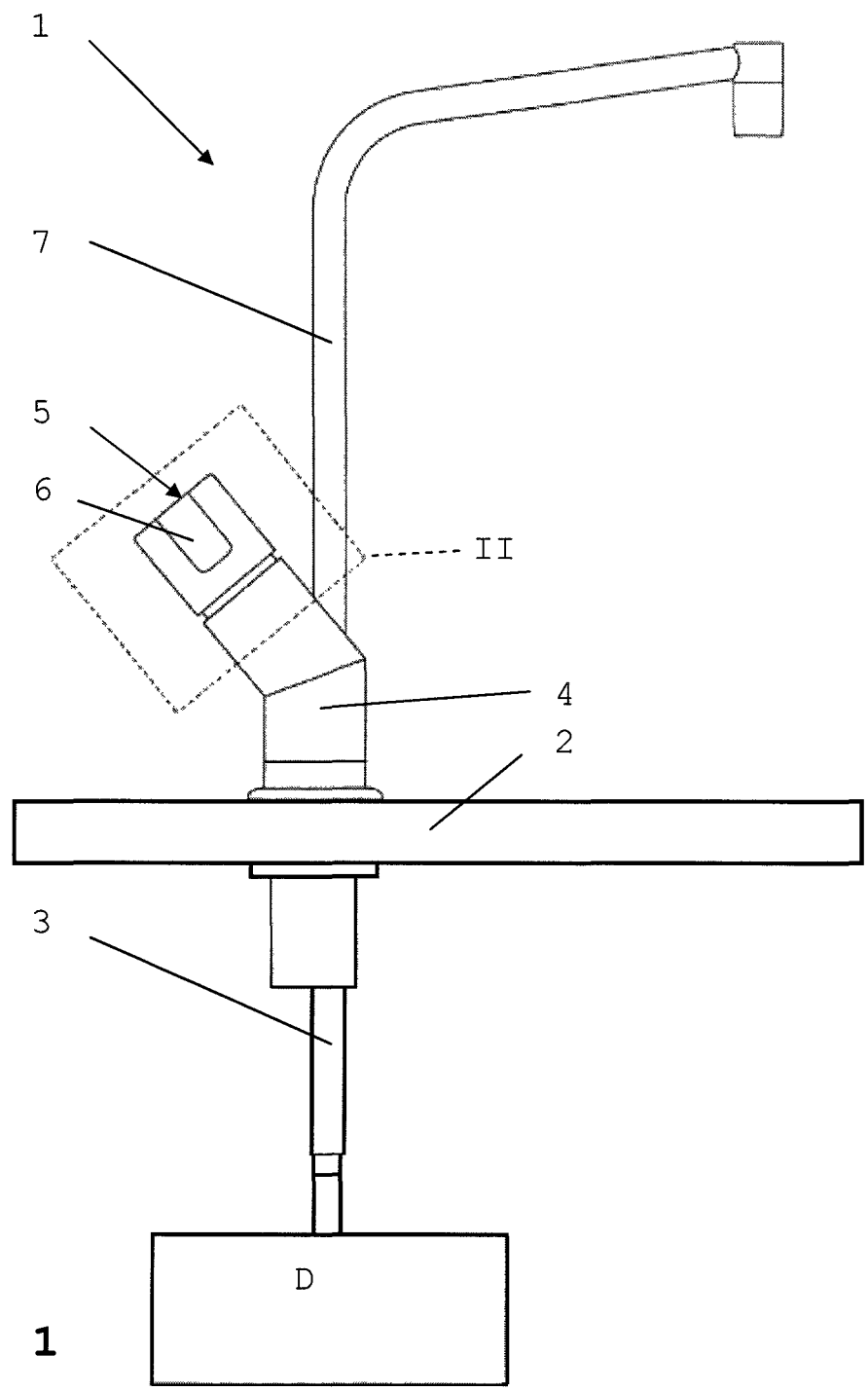
FIG. 1 is a side view of a water tap.

FIG. 1 shows a kitchen tap 1 which is mounted to a working top 2. The tap 1 has a supply line 3, a tap housing 4, an operating knob 5 with a gripping facility 6 and a discharge 7. The gripping facility 6 may be a handle, indentation or protrusion.

The supply line 3 is arranged for connection to a water supply, e.g. a pressure vessel D for storing and heating water under pressure, e.g. water mains pressure, by which running boiling water may be provided from the outlet 7.

The tap 1 is mounted to the working top 2 by means of the tap housing 4 and a locking nut. The tap 1 is operable by moving the knob 5 with respect to the tap housing 4. The operation of the knob 5 requires a push-turn motion with a translation motion in the direction of the tap housing 4 and subsequently a rotation about the tap housing 4. Operation of the tap 1 by means of the knob 5 may be mechanical, e.g. by means of a cock within the tap housing 4 connected with the knob 5, or electronic wherein the cock need not be arranged within the tap housing 4 but may be arranged on or near the pressure vessel D. The latter case provides an increased freedom for designing the tap housing 4.

Figure 2:
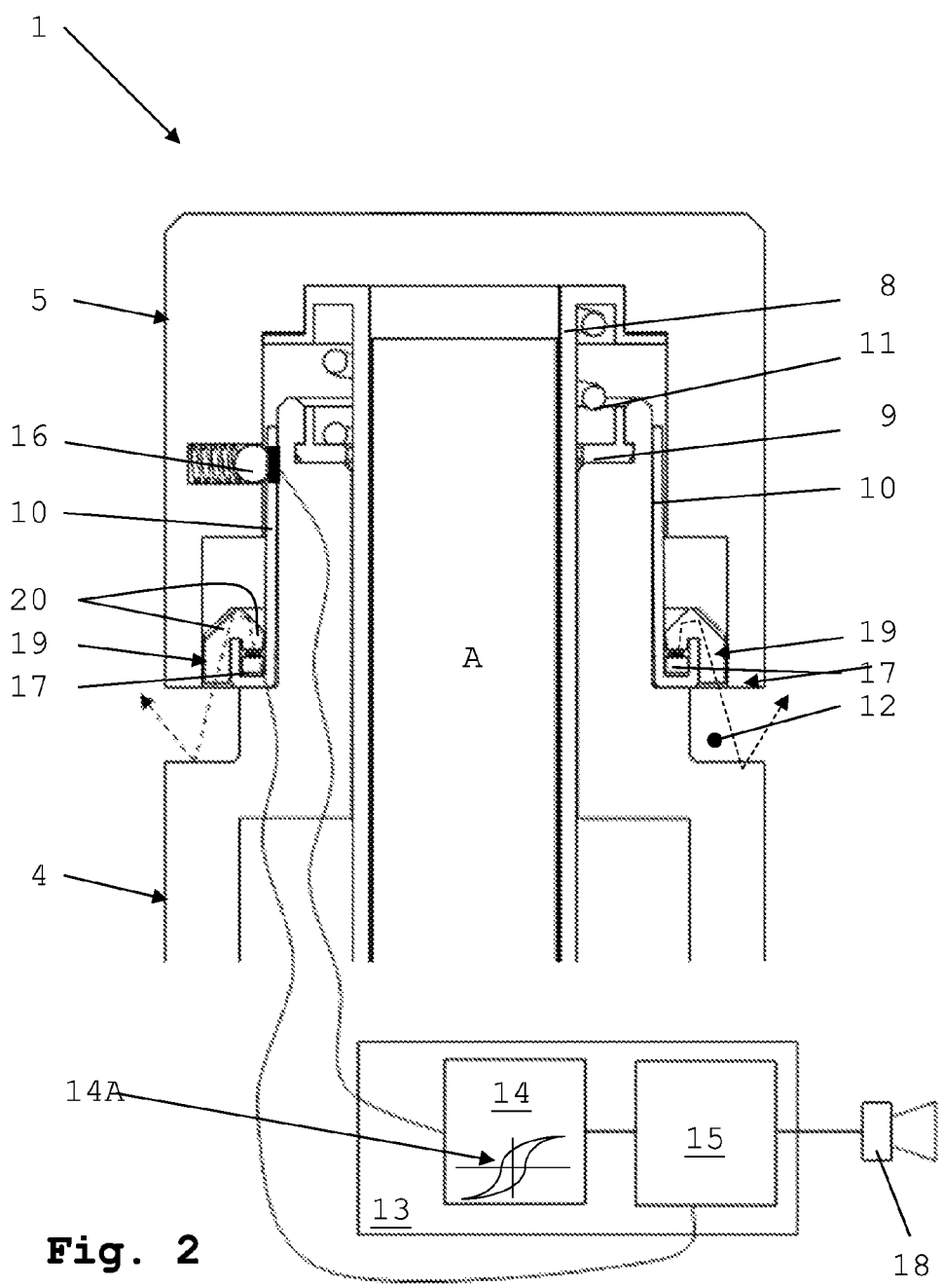
FIG. 2 is a view of a cross section of detail II of FIG. 1.

FIG. 2 shows a portion of the tap housing 4, the knob 5 and an axis A. In the shown embodiment the tap housing 4, the knob 5 and the axis A are metallic and they are mutually electrically insulated from each other by means of a number of insulators 8, 9 and 10 which here are formed substantially annularly. Between the tap housing 4 and the knob 5 a compression spring 11 is arranged electrically insulated for determining a default position of the knob 5 and providing a counterforce for the pushing motion with respect to the tap housing 4 for operation of the tap 1. In order to accommodate a pushing motion and due to the outer circumference of the tap housing 4 and the knob 5 being substantially equal in the shown embodiment, a seam 12 is provided between the tap housing 4 and the knob 5.

Insulator 10 is provided with a number of contacts that are electrically connected with a circuit 13. The circuit 13 comprises a sensor 14 and a signal generator 15. The knob 5 is electrically connected with the sensor 14 through a conducting trace on the insulator 10 by means of a movable contact 16, here in the form of a spring loaded ball, but a carbon brush, a slide contact or another type of contact that is suitable in combination with mechanical operation of the tap 1 is possible.

The sensor 14 provides via the connection an alternating voltage on at least a portion of the knob 5, which portion may be connected directly conducting with the circuit or may be coupled with it capacitively. The sensor 14 further comprises one or more detection circuits, e.g. a discriminator, a clock with a counter and/or other, possibly programmable, electronics. Upon contact of the portion of the knob 5 that is connected to the sensor with an electrically conducting object, e.g. a human hand, the impedance of the knob 5 and circuit parts connected thereto changes, in particular the capacity and/or resistance to ground. The effect of an impedance variation on the alternating voltage that is provided to the knob 5 is detectable, e.g. by comparing amplitude, frequency and/or phase of the provided signal with one or more reference values so that a contact is detectable and a detection signal which indicates that a touch has been detected may be generated.

The sensor 14 is connected with the signal generator 15 such that the detection signal is processable by the signal generator 15 for generating the intended warning signal by signalling means such as a light source 17, e.g. one or more lamps or LEDs, and/or a sound source 18, such as a speaker.

Present day electronics are so fast that detection of a touch and generation of a warning signal may be possible within a few milliseconds, which is experienced as instantaneous by a user. Such a fast reaction strengthens the direct link between touching and warning signal. Such a fast reaction further provides the opportunity to provide and/or cause to start the warning signal prior to actual operation of the knob, possibly even before the user has gripped the knob sufficiently strong to be able to perform the operation. The same holds for operation of the tap by means of a handle and/or pressing a push button. Due to this, timely reconsideration of the operation is facilitated.

Since in the shown tap 1 the knob 5 is insulated from the remainder of the tap 1 touching another portion of the tap 1 has no effect and no warning signal is generated. Another option is to comprise completely in the detection circuitry the outlet 7 and/or the tap housing 4, in addition to or instead of the knob 5, and to connect the sensor (also) to it/them.

In the shown embodiment of tap 1 a number of light sources 17 such as LEDs is arranged around the tap housing 4 so that they are shielded by the knob 5 from damage, spray water and direct visibility. Here, the light sources 17 are arranged so that the light generated by them shines up, parallel to the tap housing 4 and the outlet 7 and is not visible outside of the tap 1. An annular light guide 19 is provided for receiving the generated light and redirecting it by means of one or more reflections off reflecting surfaces 20. Here, the light is shone from the light guide 19 onto the tap housing 4 in the seam 12, so that the light becomes noticeable to a potential user of the tap 1 via reflections on the tap housing 4 (see the dotted line indicating a potential light path). The interior sides of the seam 12 may be high-reflective or rather matte-reflective. In case a number of light sources 17 is arranged at regular mutual distances around the tap housing 4, e.g. a ring of 4, 6, 8 or 12 LEDs, the light is emitted in substantially radial direction from the seam 12 of the tap 1. For a user, upon operation of the light sources 17, in particular when these emit red light, the impression is caused that the interior of the tap lights up or starts to glow. Since the light sources 17 themselves are not readily visible, especially since they are arranged in the shadow of the seam in this example, the lighting up of the tap 1, in particular the seam 12, at a touch is surprising and unexpected and a clearly noticeable warning is provided.

The disclosure is not limited to the embodiments described above, on which variations may be made. E.g. instead of a light guide, reflecting facets on a knob, handle and/or tap housing may suffice. Instead of providing the insulator 10 and a circuit 13 remote from the tap housing one or more portions of the circuit may be arranged in a tap housing and/or a knob and/or a handle.

One or more light sources may be arranged, possibly clearly visible, for emitting light directly outward and/or be arranged on an exterior side of the tap.

Figure 3:
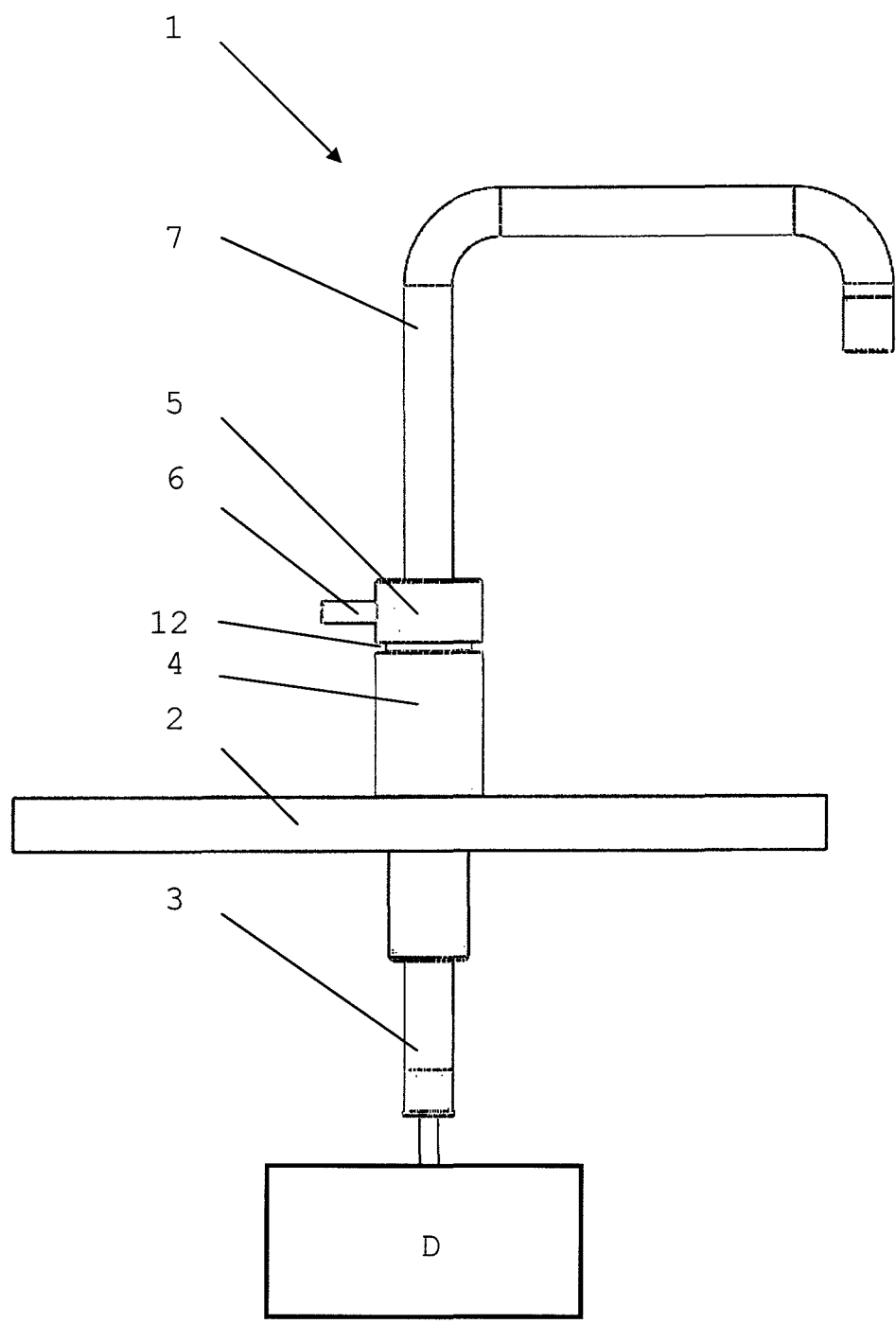
FIG. 3 is a side view of a different embodiment of a water tap.

The shape of the tap may be different, e.g. with a (push-) turn knob which is arranged concentric around the tap housing and/or outlet, as indicated in FIG. 3.

The tap need not be of metal, a conducting layer, e.g. a metallic coating, at the location of the intended touch suffices for an electrical detection to realise the disclosure.

The tap may be provided on at least a portion of the tap of which touching should be detected with conductors maintained at some distance from each other, wherein the tap is configured to cause at a touch a capacitance variation or a short circuit between two or more of the conductors for generating the detection signal. In such a way a sensor may be operated with a DC voltage, for instance.

Elements and aspects of different embodiments may be combined to different embodiments, unless explicitly stated otherwise.

The invention claimed is:

1. A water tap for supplying water, comprising:
    a tap housing having a user-operated operating element selectively movable with respect to the tap housing for operating the tap,
    a contact sensor operably connected to the user-operated operating element to generate a detection signal upon detection of a contact of the operating element by an electrically conducting object, and
    one or more signal generators receiving the detection signal and configured to generate a warning signal, and
    wherein the contact sensor and the one or more signal generators are configured to generate the warning signal immediately upon the contact of the operating element with the electrically conducting object.

2. The water tap according to claim 1, wherein the sensor comprises an electric oscillating circuit.

3. The water tap according to claim 2, wherein the sensor comprises an astable multivibrator with a hysteresis loop.

4. The water tap according to claim 1, wherein the one or more signal generators comprise a sound source.

5. The water tap according to claim 1, wherein the one or more signal generators comprise one or more light sources.

6. The water tap according to claim 5, wherein the operating element comprise a knob and wherein the one or more signal generators are disposed to emit light between the tap housing and the knob.

7. The water tap according to claim 6, wherein the tap comprises an outlet connected to the tap housing and the one or more signal generators are disposed to emit the light signal substantially radially diverging around at least the operating element and/or the outlet.

8. The water tap according to claim 5, wherein the tap comprises an outlet and the one or more signal generators are disposed to emit the light signal substantially radially diverging around at least the operating element and/or the outlet.

9. The water tap according to claim 5, wherein the tap and the arrangement of the one or more light sources are selected such that light emitted by the one or more light sources undergoes one or more reflections off one or more reflecting surfaces of portions of the tap and/or off one or more reflecting surfaces of a light guide prior to being noticeable outside of the tap.

10. The water tap according to claim 1, wherein the one or more signal generator is disposed hidden from direct visibility.

11. The water tap according to claim 1, wherein the operating element is movable by multiple motion and/or a compound motion by the electrically conducting object.

12. The water tap of claim 1, and further comprising an outlet connected to the tap housing and a hot water system fluidly coupled to the outlet.

13. The water tap according to claim 12, wherein the hot water system comprises a pressure vessel configured to deliver running boiling water, or at least water with a temperature higher than 90 degrees Celsius, from the outlet of the tap.

14. The water tap according to claim 1, wherein the water tap is a boiling water tap.

15. A water tap, comprising:
   a tap housing;
   a user-operated knob operably connected to the tap housing;
   a contact sensor operably connected to the user-operated knob to generate a detection signal upon detecting a contact of at least a portion of the knob by a user; and
   one or more signal generators receiving the detection signal and configured to generate a warning signal, wherein the one or more signal generators comprise one or more light sources configured to emit light between the tap housing and the user-operated knob.

16. The water tap according to claim 15, wherein the light is reflected off one or more reflecting surfaces of the tap and/or off one or more reflecting surfaces of a light guide.

17. A water tap, comprising:
   a tap housing having a user-operated knob selectively movable with respect to the tap housing;
   a contact sensor operably connected to the user-operated knob to generate a detection signal upon detecting a contact of at least a portion of the knob by an electrically conducting object;
   one or more signal generators receiving the detection signal and configured to generate a warning signal,
   wherein the contact sensor and the one or more signal generators are configured to generate the warning signal immediately upon the contact of the knob with the electrically conducting object, and
   wherein the one or more signal generators comprise one or more light sources configured to emit a light signal substantially radially diverging around at least the user-operated knob and/or an outlet disposed within the tap.

18. The water tap according to claim 17, wherein the light signal is reflected off one or more reflecting surfaces of the tap and/or off one or more reflecting surfaces of a light guide.

\* \* \* \* \*